2,918,646
CONVERTIBLE TEST PROBE

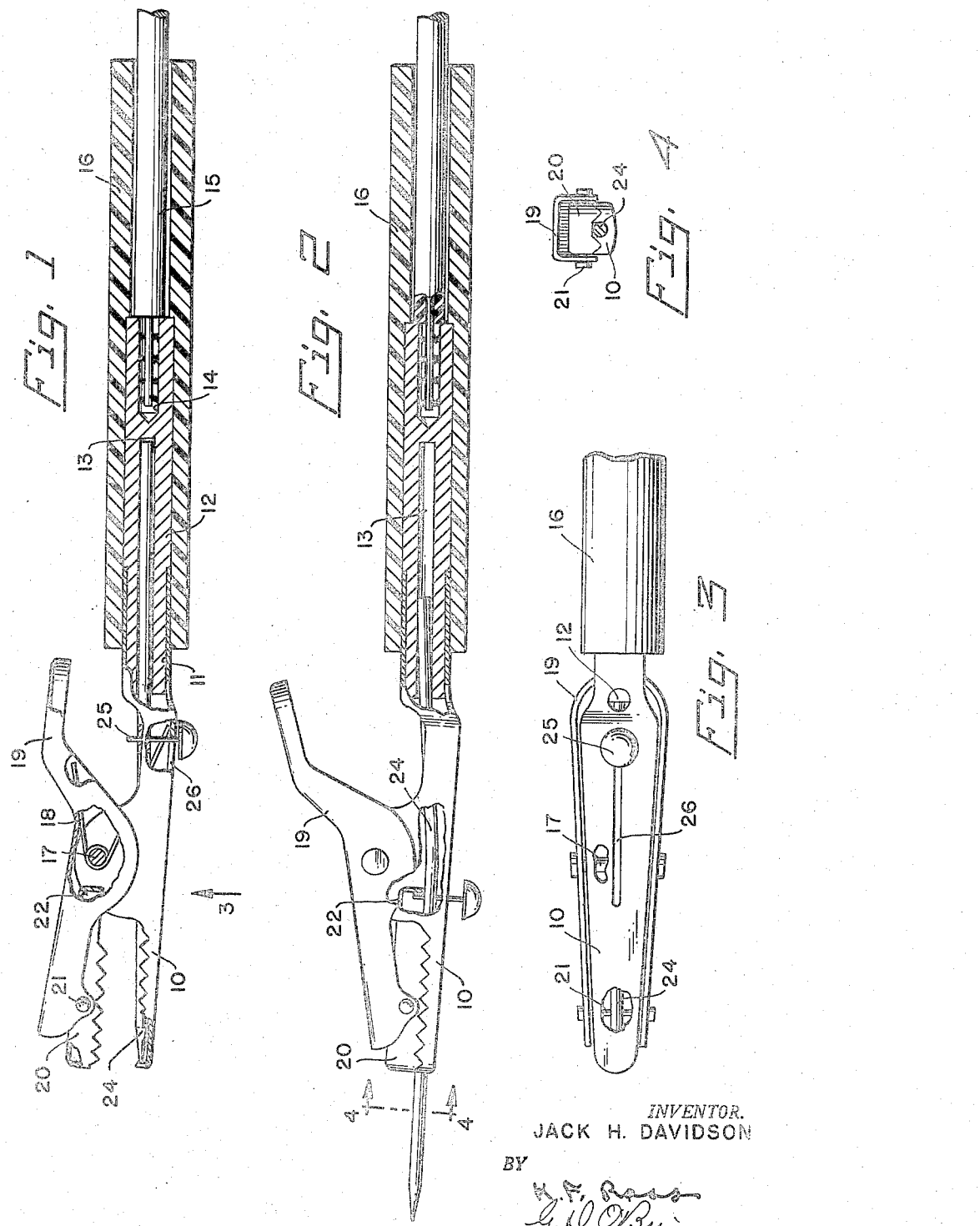

Jack H. Davidson, China Lake, Calif.

Application July 2, 1957, Serial No. 669,688

1 Claim. (Cl. 339—31)

(Granted under Title 35, U.S. Code (1952), sec. 266)

The invention described herein may be manufactured and used by or for the Government of the United States of America for governmental purposes without the payment of any royalties thereon or therefor.

This invention relates to a probe device for use on electrical and electronic instrument test leads, more particularly, it relates to a probe device which is adapted for effecting electrical test contact either by clipping, probing, or sliding contact.

Previously, electrical test contact has been made by interchanging leads with either clips or probes, or by the use of bare end or "Stakon" fitted leads inserted under screws. It is not unusual that in making tests attempts are made to hold pieces of bare wire in clip jaws as a temporary probe fixture.

The method of interchanging leads is subject to the disadvantage that three different types of leads are required and it is inconvenient to have these readily available at all times. The other procedures referred to above are makeshift procedures which are time consuming, dangerous, inconvenient to use, and unreliable.

It is therefore an object of the present invention to provide a test probe device for use on electrical and electronic instrument test leads with which electrical test contact can be effected either by clipping, probing, or sliding contact.

It is another object of this invention to provide a probe device of the above type which is simple in structure and operation and can be readily produced by simple manufacturing techniques.

It is a further object of this invention to provide a probe device of the type stated which provides good electrical contact on surfaces of various contours, such as flat, round, or wire stock.

The invention is best understood by reference to the accompanying drawing hereby made a part of this application wherein:

Fig. 1 is a side view of the probe device partly in section showing the probe of the device in nested position;

Fig. 2 is a side view of the probe device partly in section showing its probe in extended position;

Fig. 3 is a bottom view of the lower jaw of the probe device; and

Fig. 4 is a front view of the probe device looking in the direction indicated by 4—4 of Fig. 2.

In the figures, like parts are designated by like numerals. Referring to Fig. 1, the numeral 10 indicates the channel shaped lower jaw of the probe, which is made of metal. The rear end of the lower jaw 10 terminates in a rearward hollow section 11 which fits over a metal sheath 12 having a forward hollow portion 13 at its center as shown. The lower jaw section is constructed with the rear section at a slight upward angle or bend with respect to the forward section for purposes which will be explained later. A second hollow section 14 is provided in the rear of the metal sheath 12 to serve as a solder pot for soldering electrical test lead 15 to the metal sheath 12. For providing insulation for the operator the metal sheath 12 is encased in an outer tubular member 16 of non-conducting material, such as a suitable plastic, which serves as the handle to the probe. A channel shaped upper jaw 19 is hinged to the lower jaw 10 by hinge pin 17. The upper jaw is spring biased in closed position by means of spring 18 mounted, as shown. For gripping on surfaces of various type contours toothed gripper element 20 is hingedly attached to upper jaw 19 by hinge pin 21 to form a floating type gripper element. The hinged gripper element 20 is adapted to cooperate with the fixed lower jaw 10 to securely grip on elements to be tested such as flat and round surfaces and wire. The gripper sections of each jaw are hollow with teeth around the two sides. End 22 of the gripper element 20 of the upper jaw acts as a stop abutment as is explained below. For providing electrical contact with elements which cannot be gripped within the jaws of the device, slidable metal probe 24 is provided. This probe is preferably round, although not necessarily so, and due to its disproportionate length with respect to its diameter is somewhat flexible. It is adapted to nest in the lower jaw 10 and hollow 13 as shown in Fig. 1 when not in use. The hollow section 13 is offset from the bottom of lower jaw 10 as shown so that when the flexible probe is nested this feature in combination with the out of alignment feature provided by the bend in the lower jaw causes the probe to be tensioned to provide a secure fit. This provides a high pressure electrical contact between probe and jaws and thereby a good low resistance electrical lead when the probe is used for contact. The tension also prevents the probe from moving out of the nested position and sliding forward when not in use. For sliding the probe out of the nested position for use, pin 25 extending through slot 26 (Fig. 3) in lower jaw 10 and through the probe 24 is securely attached to the probe. When the probe is in the extended position as shown in Fig. 2, it is securely locked there by the edge 22 fitting over the end of pin 25, as shown. The upper jaw is opened before the probe is pushed forward so that the end of pin 25 passes beyond the end 22 and when the upper jaw is closed the end 22 serves as an abutment stop for the pin 25 to lock the probe in extended position. In Fig. 4 the position of the probe with respect to the gripper section 20 is shown when the probe is locked in open position. In operation, when the probe is nested the device can be locked on flat stock of various contours through the cooperative action of floating gripper element 20 and the fixed lower jaw 10, the teeth of lower jaw 10 extending above the nested probe. The location of the pivot point 21 of the floating upper gripper section 20 is such that a secure clamp is formed by the tips of the gripper section taking a closed position by pivoting when wires or other round or square objects are clamped at the back of the jaws. The over-all construction of the device provides a low-resistance electrical connection for testing.

It is seen from the above that a test probe device has been provided by the invention which can be used to effect electrical test contact either by clipping, probing or sliding contact. The device is readily adaptable for clamping on any type surface, including round and wire surfaces. The out of alignment feature provided by the bend in the lower jaw and the offset hollow in the handle by which the probe is tensioned in the nested position is a desirable feature as it keeps the probe securely nested in place when not in use. The feature of the probe being locked in open position by the back edge of the gripper section and the pin in the probe provides a simplified and effective means of locking the probe. The features outlined above result in a simplified device readily adaptable to mass production manufacturing techniques.

Obviously, many modifications and variations of the present invention are possible in the light of the above teachings. It is therefore to be understood that within the scope of the appended claim the invention may be practiced otherwise than as specifically described.

What is claimed is:

A test device for use on electrical and electronic instrument test leads, comprising, a channel-shaped lower jaw of metal having a forward section and a rear section, the forward section having teeth on its upper edges near the forward end and having a longitudinal slot in its bottom, the rear section terminating in a tube-shaped portion, said rear section being bent at a slightly upward angle with respect to said forward section; a hollow handle of non-conducting material; a metal cylindrical insert in the hollow of said handle having a forward tubular space and a rearward tubular space therein; the rear section of said lower jaw fitting over the forward end of said insert; an electrical conducting lead soldered in said rearward tubular space; a channel-shaped upper jaw hinged to said lower jaw and spring biased in closed position; a channel-shaped gripper element nesting in said upper jaw and hingedly attached to the sides thereof and having gripping teeth on the lower edges of its sides, said gripper element terminating rearwardly in an end; a flexible metal probe substantially equal in length to the distance between the forward end of said lower jaw and the rear end of the forward tubular space in said cylindrical insert and adapted to nest in this area when not in use and being tensioned by the bend between the forward and rear section of said lower jaw; a pin having a head thereon of larger diameter than said slot and extending through said slot and said probe and fixed to said probe whereby when the upper jaw is opened said probe can be slid forward to a position with its end extending beyond the forward end of the lower jaw for contact with objects to be tested and when the upper jaw is closed with the probe in fully extended position the probe is locked in this position by said end of the gripper element fitting behind the end of said pin.

References Cited in the file of this patent

UNITED STATES PATENTS

| | | |
|---|---|---|
| 2,190,510 | Best | Feb. 13, 1940 |
| 2,477,642 | Novello | Aug. 2, 1949 |
| 2,573,972 | Holland | Nov. 6, 1951 |
| 2,675,528 | La Point | Apr. 13, 1954 |
| 2,712,122 | Kolstad | June 28, 1955 |
| 2,754,490 | Schnoll | July 10, 1956 |